(12) United States Patent
Garcia Corrochano et al.

(10) Patent No.: US 11,549,239 B2
(45) Date of Patent: Jan. 10, 2023

(54) TRAINING MACHINE

(71) Applicant: J.C. BAMFORD EXCAVATORS LIMITED, Uttoxeter (GB)

(72) Inventors: David Garcia Corrochano, Burgos (ES); Paul Smallman, Congleton (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 541 days.

(21) Appl. No.: 16/610,869

(22) PCT Filed: May 4, 2018

(86) PCT No.: PCT/GB2018/051215
§ 371 (c)(1),
(2) Date: Nov. 4, 2019

(87) PCT Pub. No.: WO2018/203089
PCT Pub. Date: Nov. 8, 2018

(65) Prior Publication Data
US 2021/0140146 A1 May 13, 2021

(30) Foreign Application Priority Data

May 5, 2017 (GB) ...................................... 1707273
May 5, 2017 (GB) ...................................... 1707274

(51) Int. Cl.
*E02F 9/26* (2006.01)
*A01D 41/127* (2006.01)
(Continued)

(52) U.S. Cl.
CPC ............ *E02F 9/264* (2013.01); *A01D 41/127* (2013.01); *G06N 20/00* (2019.01); *G06V 20/56* (2022.01)

(58) Field of Classification Search
CPC ....... E02F 9/264; A01D 41/127; G06N 20/00; G06N 3/08; G06V 20/56
(Continued)

(56) References Cited

U.S. PATENT DOCUMENTS 5,579,442 A 11/1996 Kimoto et al.
2008/0005938 A1* 1/2008 Aebischer ............... E02F 9/264
73/32 R (Continued)

FOREIGN PATENT DOCUMENTS

EP 1 541 772 A1 6/2005
EP 3 162 967 A1 5/2017
(Continued)

OTHER PUBLICATIONS

International Search Report and Written Opinion for PCT/GB2018/051215, dated Jul. 17, 2018.
(Continued)

*Primary Examiner* — Muhammad Shafi
(74) *Attorney, Agent, or Firm* — Marshall, Gerstein & Borun LLP (57) ABSTRACT

A training machine to generate training data for supervised machine learning. The training machine is a working machine with a camera, a sensor, a body, and a moveable element moveable relative to the body. Training data is generated by capturing images, using the camera of at least a portion of the moveable element; and determining, using the sensor, sensor data which indicates the position of the moveable element in the image. The training data is used to train a machine learning algorithm to determine a position of a moveable element based on an image of at least a portion of the moveable element, without the need for corresponding sensor data.

23 Claims, 8 Drawing Sheets

(51) Int. Cl.
*G06N 20/00* (2019.01)
*G06V 20/56* (2022.01)

(58) Field of Classification Search
USPC .......................................................... 701/50
See application file for complete search history.

(56) References Cited

U.S. PATENT DOCUMENTS

| | | | |
|---|---|---|---|
| 2009/0159302 A1* | 6/2009 | Koch | ................ E02F 9/265 |
| | | | 172/1 |
| 2015/0297313 A1 | 10/2015 | Reiter et al. | |
| 2015/0329333 A1* | 11/2015 | Fen | ................ B66C 23/022 |
| | | | 212/225 |
| 2016/0247332 A1* | 8/2016 | Egawa | ................ E02F 3/438 |
| 2017/0028922 A1* | 2/2017 | Matsuo | ................ G06V 20/56 |
| 2017/0103506 A1 | 4/2017 | Dandibhotla et al. | |

FOREIGN PATENT DOCUMENTS

| | | |
|---|---|---|
| JP | H08289613 A | 11/1996 |
| WO | WO-2016/044249 A1 | 3/2016 |
| WO | WO-2016/183661 A1 | 11/2016 |

OTHER PUBLICATIONS

International Search Report and Written Opinion for PCT/GB2018/051218, dated Jul. 16, 2018.
Search Report for GB 1707273.7, dated Nov. 3, 2017.
Search Report for GB 1707274.5, dated Nov. 3, 2017.
Search Report issued in GB Application No. 1707274.5, dated May 6, 2022.
Examination Report issued in IN Application No. 201917046479, dated Apr. 2, 2022.

* cited by examiner

TRAINING MACHINE

FIELD OF THE INVENTION

The present invention relates to generating training data to train a machine learning algorithm.

BACKGROUND OF THE INVENTION

Working machines, such as backhoe loaders, usually have one or more moveable elements for performing tasks. For example, a backhoe loader has a shovel on the front and a backhoe on the rear. When performing certain tasks, such as trenching, it can be useful to know an accurate position of the moveable element. In the case of a backhoe loader, it might be desirable to obtain an accurate position for the backhoe bucket when digging a trench to a particular depth.

To determine the position of a moveable element, it is common to derive the position from one or more sensors. A sensor may detect the extension of a hydraulic actuator driving the moveable element. For example, a sensor can measure the extension of a hydraulic actuator which drives an individual section of a backhoe loader arm, or a hydraulic actuator which pivots a bucket. Alternatively, a sensor may detect rotation between individual sections of the moveable element. For example, a sensor may measure the angle of rotation between individual sections of a backhoe loader arm (such as, the angle of rotation between a boom and dipper) or may measure the angle of rotation between the arm and an attachment (such as the arm and bucket).

The extension of a hydraulic actuator is usually measured with a sensor incorporating a linear encoder. The sensor is located in a fixed position on the working machine and paired with a scale marked on the extendable portion of the hydraulic actuators. The sensor reads the scale to measure the extension of the hydraulic actuator. Sensors incorporating linear encoders are complex and expensive, increasing manufacturing costs. Additionally, they are delicate items of precision equipment which are easily damaged.

The angle of rotation between individual sections of the moveable element is usually measured using a sensor incorporating a rotary encoder. Rotary encoders are typically cheaper than linear encoders, but are weak, delicate and prone to breaking during operation, increasing operational and maintenance costs.

Repairing sensors is costly and, while damaged, it is not possible to determine the position of the moveable element. Moreover, working machines typically operate in dirty and dusty environments, and dirt or dust can affect the operation and accuracy of the sensors, for example, by obscuring the scale relied upon by a linear encoder.

It would be desirable to find a way to overcome these problems.

SUMMARY OF THE INVENTION

According to a first aspect of the invention there is provided a method of generating training data for supervised machine learning, the method comprising: operating a training machine comprising a working machine having a camera, a sensor, a body, and a moveable element, wherein the moveable element is moveable relative to the body; and generating training data by: capturing, using the camera, an image of at least a portion of the moveable element; and determining, using the sensor, sensor data which corresponds to the image, wherein the sensor data indicates the position of the moveable element in the image.

The training data provides an image with corresponding sensor data which can be used for supervised machine learning, to train a machine learning algorithm to predict, once trained, the position of the moveable element on a working machine, based solely on an image, without the need for sensors. This is advantageous because it allows working machines to be built in the future which do not require sensors. Sensors tend to the expensive and prone to damage, so removing the need for sensors reduces the cost of manufacturing a working machine and makes the working machine more reliable and durable.

By position of the moveable element, it is meant that the position of one or more points on the moveable element may be determined (such as, one or more points on an attachment, like the edge of a bucket or tip of a breaker), and/or the orientation of the moveable element may be determined. The position of the moveable element may be determined relative to the working machine. If the position of the working machine in the real world is known, for example, from global positioning system measurements, then the position of the moveable element in the real world can also be determined.

The method may comprise capturing, using the camera, a plurality of images of at least a portion of the moveable element; and determining, using the sensor, sensor data which corresponds to each image of the plurality of images, wherein the sensor data indicates the position of the moveable element in each image.

Generating training data may comprise the steps of: operating the training machine during normal operations of a working machine; and capturing, using the camera, a plurality of images, wherein each image is captured at an instance during the normal operations and each image comprises an image of at least a portion of the moveable element at the instance; and using the sensor, determining sensor data corresponding to each image, wherein the sensor data corresponding to each image indicates the position of the moveable element in the respective image.

A training machine may be a regular working machine which is sent out on normal operations to collect training data as the training machine undergoes the normal operations. For example, the training machine could be sold to an operator as a regular working machine and the training machine may generate training data as the operator uses the training machine during regular, day-to-day-operations.

Operating the training machine during normal operations may include moving the moveable element through a range of movements expected during normal operations.

Operating the training machine under normal operations of a working machine may include operating the training machine during regular, or typical, day-to-day operation of a working machine. Normal operations may include operating the training machine through a full range of different tasks that a working machine might often, or occasionally, be required to perform. For example, normal operations of a backhoe loader may include use of the backhoe loader during typical construction operations on a building site such as digging a trench; normal operations of a tractor may include use of the tractor on a farm; and normal operations of a forklift may include use of the forklift to retrieve and carry goods in a warehouse. By generating training data while operating the training machine through a wide range of different tasks that a working machine may be required to perform, the training data will provide a thorough training for the machine learning algorithm which will improve the ability of the machine learning algorithm to accurately determine the position of the moveable element in images taken during a wide range of different tasks and under many different circumstances (such as different sites, lighting conditions, etc). Once sufficient training data has been collected to train the machine learning algorithm to be able to accurately determine the position of a moveable element from an image alone, without the need for sensors, working machines may be built which do not require sensors for determining the position of the moveable element.

Operating the training machine under normal operations might include operating the training machine under varying weather conditions, for example, rain, snow, fog, sleet, hail, and sunshine. Operating the training machine under normal operations may comprise operating the training machine under different lighting conditions, for example, by operating the working machine at various times of day, such as, daytime, night time, twilight, dusk, and sunrise. This will improve the reliability of the machine learning algorithm to identify the position of moveable elements working on a wide range of possible site operations, in a wide range of weather conditions and at different times of day.

The training machine may be one of: construction and agricultural machinery, with digging or materials handling capabilities, including but not limited to a backhoe loader; a tractor; a forklift; a skid steer loader; an excavator; and a telescopic handler.

The moveable element may comprise a plurality of individual moveable sections. Each individual moveable section may be translatable (e.g. telescopic) or may be pivotable with respect to one or more other individual moveable sections. For example, the moveable element may be an arm where the individual moveable sections comprise a boom, a dipper and an attachment. The machine learning algorithm may determine a position of one or more of the plurality of individual moveable sections. Determining the position of one or more of the plurality of individual moveable sections may include determining an orientation of one or more of the plurality of individual moveable sections, or determining a relative orientation between two or more of the plurality of individual moveable sections.

The moveable element may comprise an arm and/or an attachment.

Operating the training machine under normal operations may include moving the arm and attachment through a range of motions expected during use of the arm and attachment during normal operations of the arm and attachment.

The attachment may be one of: an earthmoving attachment, a materials handling attachment, a forestry attachment, a waste handling attachment, or an agricultural attachment.

The camera may be arranged to provide an angle of view which covers a desired range of movement of the moveable element. This ensures that the machine learning algorithm will be able to determine the position of the moveable element across the desired range of movement of the moveable element.

Hydraulic equipment may be arranged to move the moveable element, and the camera may be arranged to provide a view of at least a portion of the hydraulic equipment.

The position, orientation and extension of hydraulic equipment (such as hydraulic rams), helps the machine learning algorithm to accurately determine the position of the moveable element.

The training data may be transferred to a computer comprising the machine learning algorithm for supervised machine learning. The method may comprise storing the training data on a storage device. The storage device may be removable, and may be removed and connected to the computer to transfer the training data to the computer. Additionally, or alternatively, the training data may be transferred from the storage device to a portable storage device for transfer to the computer. The method may comprise transmitting the training data, over a communications network (such as a cellular or wireless communications network) to the computer.

The machine learning algorithm may comprise a neural network. A neural network has been found to be particularly accurate at determining the position of the moveable element based on images. Optionally, the neural network is a supervised deep learning neural network. In trials, the neural network has been found to classify the position correctly in up to 97% of occasions with supervised deep learning. Alternatively, the neural network may be a supervised convolutional neural network, which has been found to be particularly accurate at determining the position of the moveable element based on images.

According to a second aspect of the invention there is provided a training machine to generate training data for supervised machine learning, the training machine comprising: a working machine having a body, a moveable element, a camera and a sensor; wherein the moveable element is moveable relative to the body; the camera is arranged to capture an image of at least a portion of the moveable element; and the sensor is configured to determine sensor data that is indicative of a position of the moveable element; the training machine further comprising: a processor configured to generate training data by receiving an image from the camera and corresponding sensor data from the sensor indicative of the position of the moveable element in the image.

The training machine generates training data comprising an image with corresponding sensor data which can be used for supervised machine learning, in order to train the machine learning algorithm to predict the position of the moveable element on a working machine, based solely on an image, without the need for sensors. This is advantageous because it allows working machines to be built in the future which do not require sensors. Sensors tend to the expensive and prone to damage, so removing the need for sensors reduces the cost of manufacturing a working machine and makes the working machine more reliable and durable.

By position of the moveable element, it is meant that the position of one or more points on the moveable element may be determined (such as, one or more points on an attachment, like the edge of a bucket or tip of a breaker), and/or the orientation of the moveable element may be determined. The position of the moveable element may be determined relative to the working machine. If the position of the working machine in the real world is known, for example, from global positioning system measurements, then the position of the moveable element in the real world can also be determined. The camera may be arranged to capture a plurality of images of at least a portion of the moveable element; and determining, using the sensor, sensor data which corresponds to each image of the plurality of images, wherein the sensor data indicates the position of the moveable element in each image.

The processor may be configured to generate training data by: receiving a plurality of images from the camera, wherein each image is captured at an instance during normal operations and each image comprises an image of at least a portion of the moveable element at the instance; and receiving sensor data corresponding to each image, wherein the sensor data corresponding to each image indicates the position of the moveable element in the respective image.

A training machine may be a regular, production, working machine which is sent out on normal operations to collect training data as the training machine undergoes normal operations. For example, the training machine could be sold to an operator as a regular, production, working machine and the training machine may generate training data as the operator uses the training machine during regular, day-to-day-operations.

Normal operations may including moving the moveable element through a range of movements expected during normal operations.

Normal operations may include operating the training machine during regular, or typical, day-to-day operation of a working machine. Normal operations may include operating the training machine through a full range of different tasks that a working machine might often, or occasionally, be required to perform. For example, normal operations of a backhoe loader may include use of the backhoe loader during typical constructions operations on a building site such as digging a trench; normal operations of a tractor may include use of the tractor on a farm; and normal operations of a forklift may include use of the forklift to retrieve and carry goods in a warehouse. By generating training data while operating the training machine through a wide range of different tasks that a working machine may be required to perform, the training data will provide a thorough training for the machine learning algorithm which will improve the ability of the machine learning algorithm to accurately determine the position of the moveable element in images taken during a wide range of different tasks and under many different circumstances (such as different sites, lighting conditions, etc). Once sufficient training data has been collected to train the machine learning algorithm to be able to accurately determine the position of a moveable element from an image alone, without the need for sensors, working machines may be built which do not require sensors for determining the position of the moveable element.

Normal operations might include operating the training machine under varying weather conditions, for example, rain, snow, fog, sleet, hail, and sunshine. Operating the training machine under normal operations may comprise operating the training machine under different lighting conditions, for example, by operating the working machine at various times of day, such as, daytime, night time, twilight, dusk, and sunrise. This will improve the reliability of the machine learning algorithm to identify the position of moveable elements working on a wide range of possible site operations, in a wide range of weather conditions and at different times of day.

The training machine may be one of: construction and agricultural machinery, with digging or materials handling capabilities, including but not limited to a backhoe loader; a tractor; a forklift; a skid steer loader; an excavator; and a telescopic handler.

The moveable element may comprise a plurality of individual moveable sections. Each individual moveable section may be translatable (e.g. telescopic) or may be pivotable with respect to one or more other individual moveable sections. For example, the moveable element may be an arm where the individual moveable sections comprise a boom, a dipper and an attachment. The machine learning algorithm may determine a position of one or more of the plurality of individual moveable sections. Determining the position of one or more of the plurality of individual moveable sections may include determining an orientation of one or more of the plurality of individual moveable sections, or determining a relative orientation between two or more of the plurality of individual moveable sections.

The moveable element may comprise an arm and an attachment.

Normal operations may include moving the arm and attachment through a range of motions expected during use of the arm and attachment during normal operations of the arm and attachment.

The sensor may be configured to determine the position of the arm or attachment.

The sensor may be configured to determine at least of one: an extension of a hydraulic actuator driving the arm; and an angle of rotation between sections of the arm.

The attachment may be one of: an earthmoving attachment, a materials handling attachment, a forestry attachment, a waste handling attachment, or an agricultural attachment.

The camera may be arranged to provide an angle of view which covers a desired range of movement of the moveable element. This ensures that the machine learning algorithm will be able to determine the position of the moveable element across the desired range of movement of the moveable element.

The camera may be arranged in the same position and orientation as a camera on a production working machine, and the camera may be arranged to provide the same angle of view as a camera on a production working machine.

To ensure that the machine learning algorithm works in an optimum way, and to improve the chance of the machine learning algorithm accurately determining the position of the moveable element based solely on the image, without the need for sensors, the camera that is used for training the machine learning algorithm (the camera on the training machine that provides the training data for training the machine learning algorithm) is located in the same position and orientation, and provides the same angle of view, as the camera on the production working machine where the machine learning will be used.

The training machine may further comprise hydraulic equipment arranged to move the moveable element, and the camera may be arranged to provide a view of at least a portion of the hydraulic equipment. The position, orientation and extension of hydraulic equipment (such as hydraulic rams) helps the machine learning algorithm to accurately determine the position of the moveable element.

The training machine may comprise a storage device configured to store the training data, to allow for transfer of the training data to a computer comprising the machine learning algorithm for supervised machine learning. The storage device may be removable, and connectable to the computer for transfer of the training data to the computer. The training machine may comprise an output connectable to a portable storage device, for transferring the training data. The training machine may comprise a communications interface configured to transmit the training data over a communications network (such as a cellular or wireless communications network) to the computer.

The machine learning algorithm may comprise a neural network. A neural network has been found to be particularly accurate at determining the position of the moveable element based on images. Optionally, the neural network is a supervised deep learning neural network. In trials, the neural network has been found to classify the position correctly in up to 97% of occasions with supervised deep learning. Alternatively, the neural network may be a supervised convolutional neural network, which has been found to be particularly accurate at determining the position of the moveable element based on images.

According to a third aspect of the invention there is provided a computer-implemented method of training a machine learning algorithm to determine a position of a moveable element of a working machine based on an image of at least a portion of the moveable element, the method comprising: providing training data comprising: a plurality of images of a moveable element, each image of the plurality of images having corresponding sensor data indicative of a position of the moveable element in the respective image; and using the training data, in order to train the machine learning algorithm to recognise a position of a moveable element in an image without corresponding sensor data.

By position of the moveable element, it is meant that the position of one or more points on the moveable element may be determined (such as, one or more points on an attachment, like the edge of a bucket or tip of a breaker), and/or the orientation of the moveable element may be determined. The position of the moveable element may be determined relative to the working machine. If the position of the working machine in the real world is known, for example, from global positioning system measurements, then the position of the moveable element in the real world can also be determined.

The training data may have been generated by a training machine according to the second aspect of the invention.

The images may comprise grayscale images or full colour images. The advantage of using a grayscale images is that the machine learning algorithm will not be limited to recognising working machines having the same colour for which the machine learning algorithm was trained, and the processing speed of the machine learning algorithm may be increased.

The machine learning algorithm may comprise a neural network. A neural network has been found to be particularly accurate at determining the position of the moveable element based on images. Optionally, the neural network is a supervised deep learning neural network. In trials, the neural network has been found to classify the position correctly in up to 97% of occasions with supervised deep learning. Alternatively, the neural network may be a supervised convolutional neural network, which has been found to be particularly accurate at determining the position of the moveable element based on images.

According to a fourth aspect of the invention there is provided a computer-readable medium comprising training data generated according to the method of the third aspect of the invention.

According to a further aspect of the invention there is provided a working machine comprising: a body and a moveable element, wherein the moveable element is moveable relative to the body; a camera, arranged to capture an image of at least a portion of the moveable element; and a processor configured to execute a machine learning algorithm trained to determine a position of a moveable element from an image of the moveable element, wherein the machine learning algorithm receives the image from the camera and determines the position of the moveable element in the image.

The machine learning algorithm is able to predict the position of the moveable element without the need for sensors, which is advantageous because sensors tend to be expensive and prone to damage, and the dirty and dusty environment in which working machines typically operate can affect the operation and accuracy of sensors. Hence, the use of the machine learning algorithm to predict the position of the moveable element reduces the cost of the working machine and improves reliability.

By position of the moveable element, it is meant that the position of one or more points on the moveable element may be determined, and/or the orientation of the moveable element may be determined. The position of the moveable element may be determined relative to the working machine. If the position of the working machine in the real world is known, for example, from global positioning system measurements, then the position of the moveable element in the real world can also be determined.

The machine learning algorithm may comprise a neural network. A neural network has been found to be particularly accurate at determining the position of the moveable element based on images. Optionally, the neural network is a supervised deep learning neural network. In trials, the neural network has been found to classify the position correctly in up to 97% of occasions with supervised deep learning. Alternatively, the neural network may be a supervised convolutional neural network, which has been found to be particularly accurate at determining the position of the moveable element based on images.

The working machine may be one of: construction and agricultural machinery, with digging or materials handling capabilities, including but not limited to a backhoe loader; a tractor; a forklift; a skid steer loader; an excavator; and a telescopic handler.

The moveable element may comprise a plurality of individual moveable sections. Each individual moveable section may be translatable (e.g. telescopic) or may be pivotable with respect to one or more other individual moveable sections. For example, the moveable element may be an arm where the individual moveable sections comprise a boom, a dipper and an attachment. The machine learning algorithm may determine a position of one or more of the plurality of individual moveable sections. Determining the position of one or more of the plurality of individual moveable sections may include determining an orientation of one or more of the plurality of individual moveable sections, or determining a relative orientation between two or more of the plurality of individual moveable sections.

The moveable element may comprise an attachment. The machine learning algorithm is able to predict the position of one or more points on the attachment. The attachment may, for example, be a tool (such as a breaker, a blade, or a cutter), a bucket, or forks. The machine learning algorithm may predict the position of a point or edge at which the attachment contacts a workpiece (such as the edge of a bucket or the tip of a breaker). This may be used to provide guidance to assist an operator to position the attachment with respect to the workpiece (such as the ground) for precision operations (such as, digging a trench of a desired depth) or to permit fully automatic control of the attachment.

The machine learning algorithm is also able to determine an orientation of the attachment.

The moveable element may comprise an arm and an attachment. The arm may comprise a plurality of individual sections, wherein each section is independently moveable. The arm may comprise a boom and a dipper. The machine learning algorithm may be able to predict the position of one or more points on the arm (such as the pivot points between sections), the orientation of the arm, or the relative orientation between sections of the arm.

The attachment may be one of: an earthmoving attachment, a materials handling attachment, a forestry attachment, a waste handling attachment, or an agricultural attachment.

The processor may be configured to receive an update to the machine learning algorithm. The update may be configured to train the machine learning algorithm to determine the position of a new type of attachment.

The processor may receive the update from an appropriate source, for example, but not limited to a storage medium temporarily connected to the working machine, or for example, from a compact disc, or a device temporarily attached to the working machine (such as a memory stick connected to a USB socket) or from a communications interface which is coupled to a communications network (such as a cellular or WiFi communications network) and the update may be transmitted from a server over the communications network.

The machine learning algorithm may have been trained using training data generated by a training machine.

The training data may be generated by operating the training machine under actual operations.

Operating the training machine under normal operations may include operating the training machine during regular, or typical, day-to-day operation of a working machine. Normal operations may include operating the training machine through a full range of different tasks that a working machine might often, or occasionally, be required to perform. For example, normal operations of a backhoe loader may include use of the backhoe loader during typical constructions operations on a building site, such as digging different types of trenches in different conditions; normal operations of a tractor may include use of the tractor on a farm; and normal operations of a forklift may include use of the forklift to retrieve and carry goods in a warehouse. By operating the training machine through a wide range of different tasks that a working machine may be required to perform, the training data will provide a thorough training for the machine learning algorithm which will improve the ability of the machine learning algorithm to accurately determine the position of the moveable element in images taken during a similarly wide range of different tasks and under many different circumstances (such as different sites, lighting conditions, and weather conditions).

Operating the training machine under normal operations might include operating the training machine under varying weather conditions, for example, rain, snow, fog, sleet, hail, and sunshine. Operating the training machine under normal operations may comprise operating the training machine under different lighting conditions, for example, by operating the working machine at various times of day (such as, daytime, night time, twilight, dusk, and sunrise) and operating the working machine under artificial light. Collecting training data over a wide range of different weather and/or lighting conditions will improve the reliability of the machine learning algorithm to identify the position of the moveable elements from images taken under a similarly wide range of weather and/or lighting conditions.

The training machine may be of the same type as the working machine. The moveable element may comprise an attachment, and the training machines may comprise an attachment of the same type as the working machine.

This technique is applicable to any type of working machine and attachment, as long as the machine learning algorithm has been trained for the particular combination of working machine and attachment. For example, the machine learning algorithm may determine the position of a bucket on a backhoe loader if the machine learning algorithm has been trained using training data obtained from an equivalent backhoe loader with the same type of bucket.

The camera may be arranged in the same position and orientation as a camera on the training machine. The camera may be arranged to provide the same angle of view as a camera on the training machine.

To ensure that the machine learning algorithm works in an optimum way, and to improve the chance of the machine learning algorithm accurately determining the position of the moveable element, the camera on the working machine is located in the same position and orientation, and provides the same angle of view, as the camera that was used for training the machine learning algorithm, that is, the camera of the working machine must be located in the same position and orientation, and provide the same angle of view, as the camera located on the training machine that provided the training data that was used to train the machine learning algorithm.

The machine learning algorithm hay have been trained using training data. The training data may comprise a plurality of images of at least a portion of a moveable element, each image of the plurality of images having corresponding sensor data indicative of the position of the moveable element in the respective image.

The training data may have been generated using a training machine comprising a working machine having a camera, a sensor, a body and a moveable element, wherein the moveable element is moveable relative to the body. The plurality of images may have been captured, using the camera, and the sensor data has been determined using the sensor.

The camera may be arranged to provide an angle of view which covers a desired range of movement of the moveable element.

The working machine may further comprise hydraulic equipment arranged to move the moveable element, and the camera may be arranged to provide a view of at least a portion of the hydraulic equipment.

The position, orientation and extension of hydraulic equipment (such as hydraulic actuators), helps the machine learning algorithm to accurately determine the position of the moveable element, and may allow the machine learning algorithm to infer a position of a portion of the moveable element that is out of view of the camera.

The processor may be configured to communicate the determined position to another device, or display the determined position on a display.

BRIEF DESCRIPTION OF THE DRAWINGS

The invention shall now be described, by way of example only, with reference to the accompanying drawings in which:

FIG. 3b shows the machine learning process carried out by the processor of the machine learning system in FIG. 3a;

DETAILED DESCRIPTION

Figure 1:
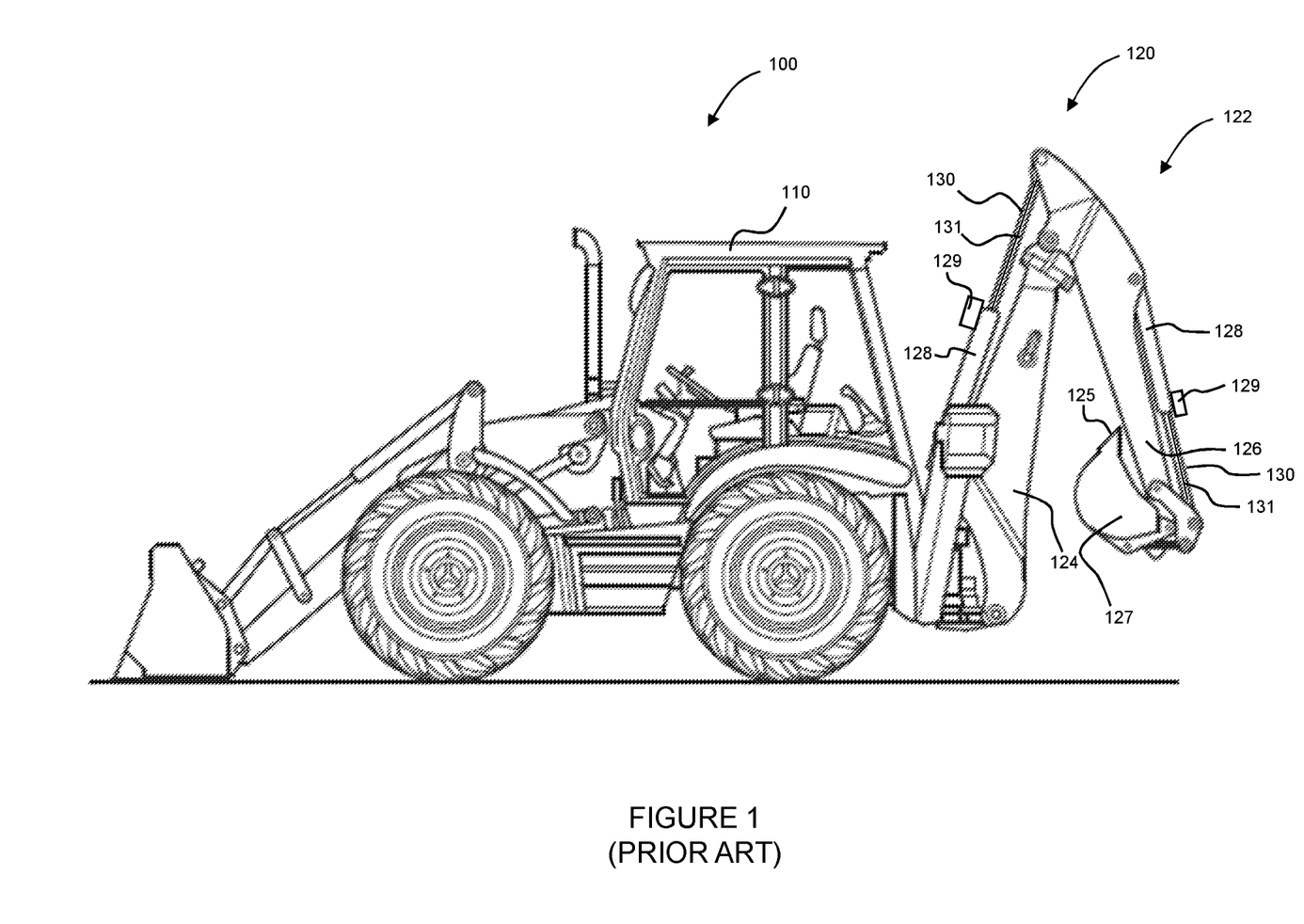
FIG. 1 illustrates a backhoe loader with sensors for determining the position of a bucket.

FIG. 1 illustrates a prior art working machine which determines the position of its moveable element using a number of sensors. In this case, the working machine is a backhoe loader 100. The backhoe loader 100 has a tractor-like body 110 with a moveable element in the form of backhoe 120 mounted to the rear of the body 110. The backhoe 120 has an arm 122 with two sections: the boom 124 and the dipper 126. The boom 124 is pivotably connected to the rear of the body 110. The boom 124 is pivotably connected to the dipper 126. A bucket 127 is pivotably connected to the end of the dipper 126. Hydraulic actuators 128 control pivoting of the boom 124, the dipper 126 and the bucket 127 in order to control the position of the bucket 127 as required for any given task, such as trenching.

Each hydraulic actuator 128 has a sensor 129 incorporating a linear encoder for measuring the extension of an extendable portion 130 of the hydraulic actuator 128. Each sensor 129 is fixed adjacent to an extendable portion 130 of a hydraulic actuator 128 (for example, the sensor 129 may be fixed to the housing of the hydraulic actuator 128). Each sensor 129 reads a scale 131 which is marked on the extendable portion 130 of the adjacent hydraulic actuator 128, in order to measure the extension of the extendable portion 130 of the hydraulic actuator 128.

The position and orientation of the bucket 127 relative to the backhoe loader 100 (or the position and orientation of one or more desired points on the bucket 127, such as the edge 125 of the bucket 127) can be derived from the extensions of the hydraulic actuators 128 measured with the sensors 129 and knowledge of the geometry of the backhoe 220. However, the sensors 129 are complex and expensive, leading to increased manufacturing costs. The sensors 129 are delicate items of precision equipment which are easily damaged, and repairing sensors 129 is costly and, while damaged, it is not possible to determine the position and orientation of the bucket 127 until the sensors 129 are repaired, decreasing user satisfaction. Moreover, the backhoe loader 100 typically operates in dirty and dusty environments, meaning that dirt or dust may obscure the scale 131 and affect the operation and accuracy of the sensors 129.

Figure 2:
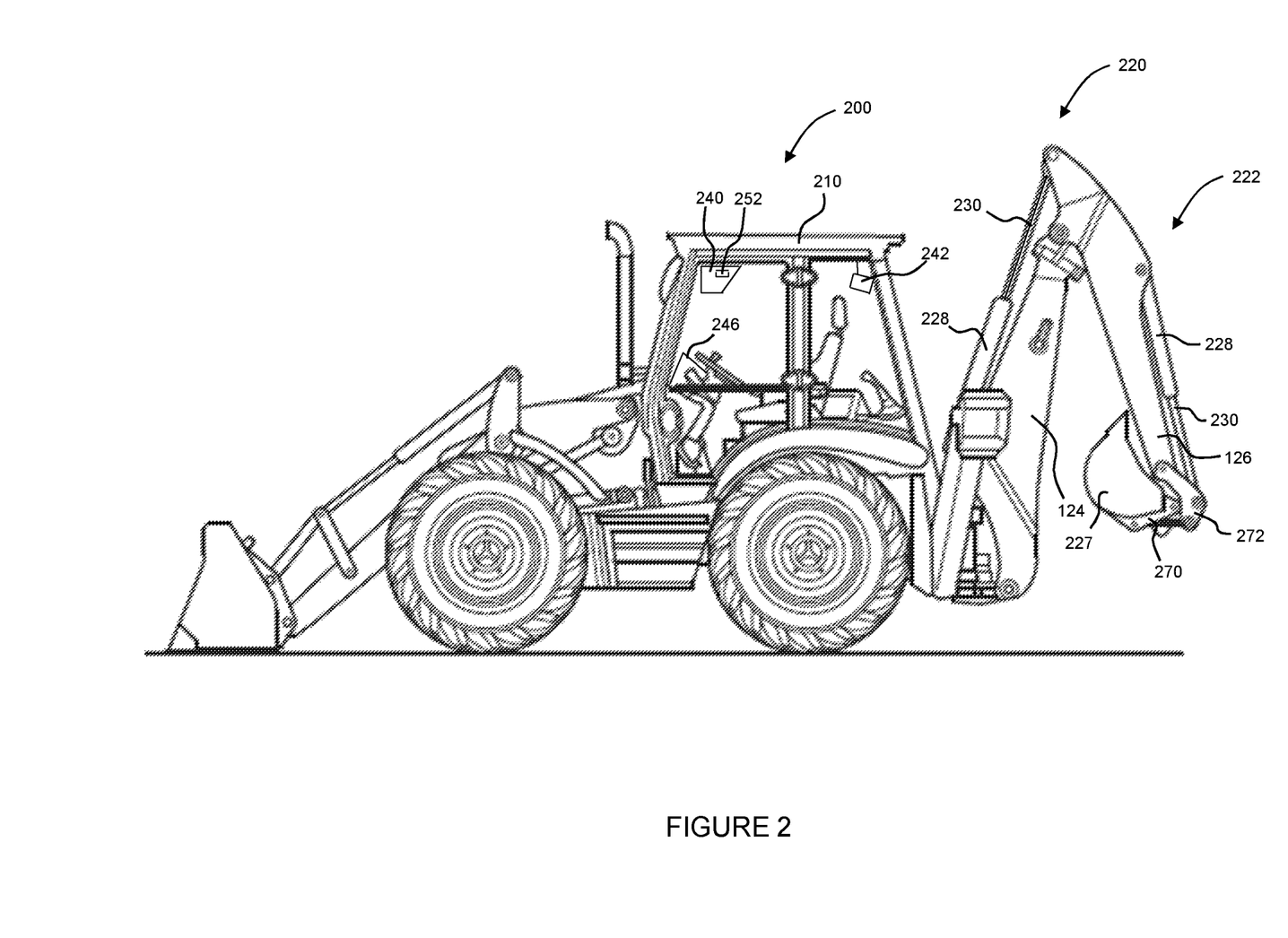
FIG. 2 illustrates a backhoe loader with a camera and a machine learning system, where the backhoe loader uses a machine learning system to determine the position of the bucket based on images from the camera.

FIG. 2 illustrates a backhoe loader 200 according to the present invention which does not require sensors 129 or a scale 131 to determine the position of its bucket 227.

The backhoe loader 200 shown in FIG. 2 is the same as the backhoe loader 100 of FIG. 1, with the exception that the backhoe loader 200 does not have any sensors 129 and does not need to have scales 131 marked on the extendable portions 230 of the hydraulic actuators 228. Instead, the backhoe loader 200 in FIG. 2 has a rear-facing camera 242 mounted inside the cab of the backhoe loader 100.

The camera 242 has a good view of the backhoe 220, with an angle of view which is sufficient for the camera 242 to see the backhoe 220, or at least part of the backhoe 220, during a full range of movements the backhoe 220 is capable of making.

The camera 242 is coupled to a neural network system 240 that processes images from the camera 242 through a neural network to determine the position of the bucket 227 using images from the camera 242 alone, without the need for sensors 129.

The camera 242 does not necessarily need to be able to see the whole backhoe 220 in order to determine the position of the bucket 227, as the neural network may be able to infer the position of the bucket from the portion of the backhoe 220 that the camera 242 can see. In some cases, the bucket 227 may be out of view of the camera 242 (for example, when digging a trench, the bucket 227 may be out of view in the trench). This means that the camera 242 will not be able to directly see the position and orientation of the bucket 227. However, the position and orientation of the bucket 227 may be inferred from other information in the image. For example, the position, orientation and extension of hydraulic equipment (such as, the extension of the extendable portion 230 of the hydraulic rams) or the angular position of the linkages 270 and 272 which rotate the bucket 227.

The camera 242 is coupled to a neural network system 240 that processes images from the camera 242 through a neural network to determine the position of the bucket 227 using images from the camera 242 alone, without the need for sensors 129.

Figure 3A:
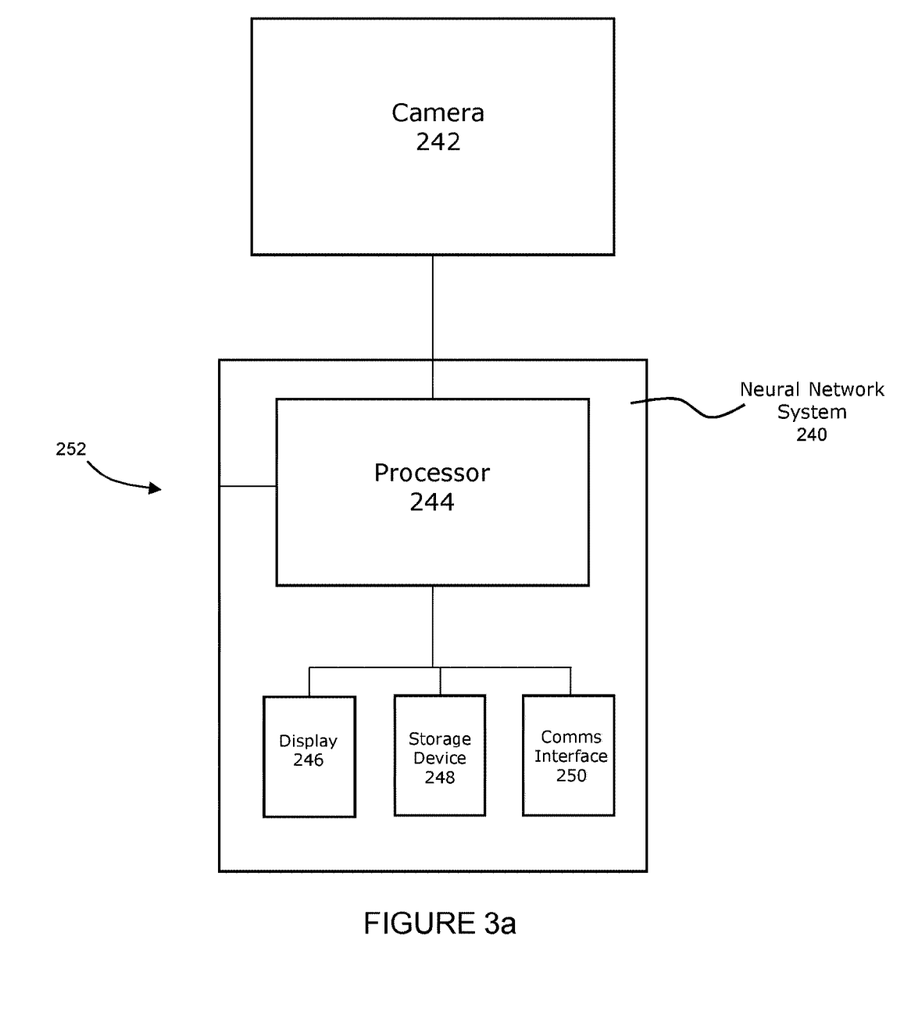
FIG. 3a shows the machine learning system.

FIG. 3a illustrates the neural network system 240 in more detail. The neural network system 240 has a processor 244 which receives images of the backhoe 220 from camera 242. The processor 244 executes a neural network process 260, shown in more detail in FIG. 3b.

Figure 3B:
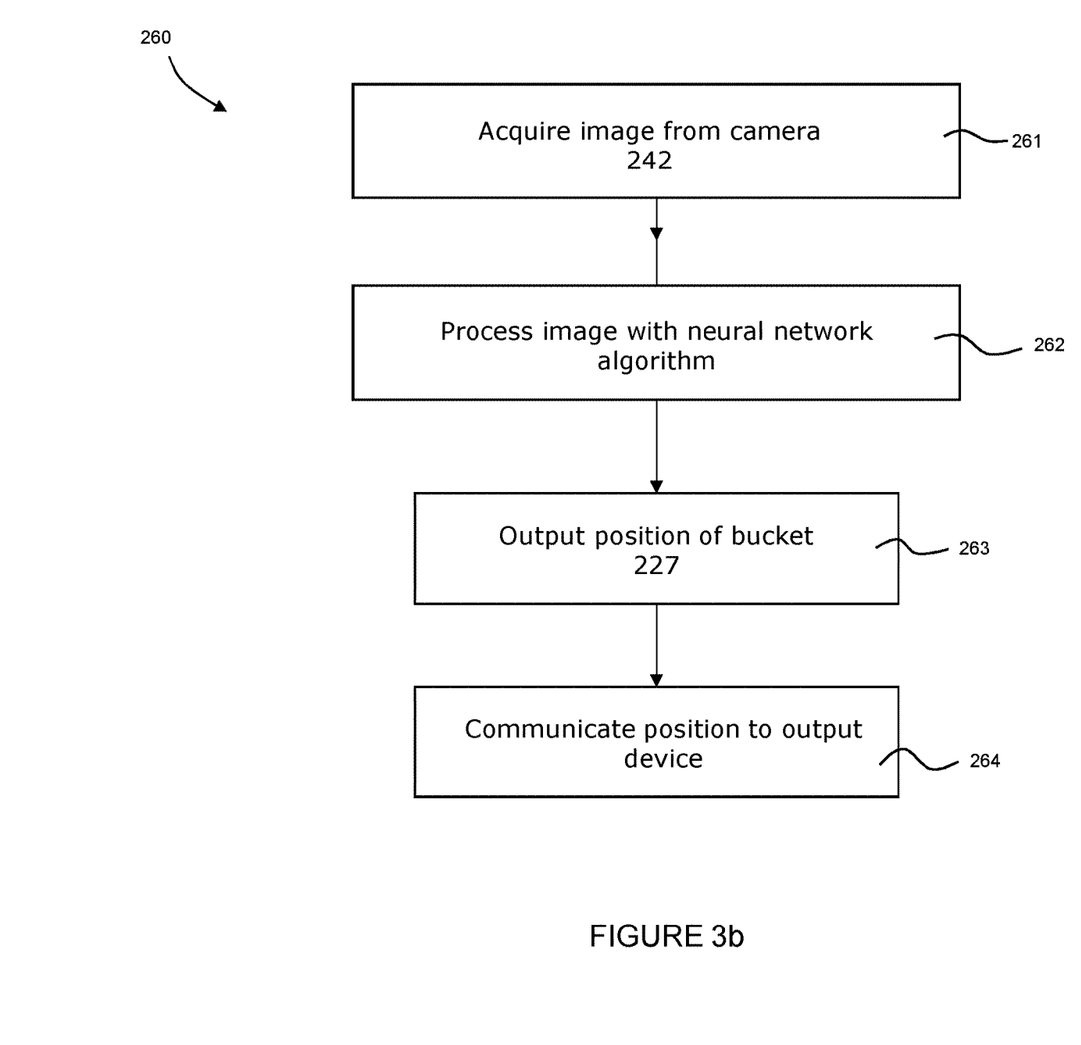

FIG. 3b illustrates the neural network process 260 which is carried out by processor 244 in the neural network system 240. An image is acquired from the camera 242 at step 261. At step 262, the image is processed through a neural network algorithm that has previously been trained to determine the position of a bucket 227 from images of the backhoe 220. The neural network algorithm outputs the determined position of the bucket 227 at step 263 and, at step 264, the position of the bucket 227 is communicated to an output device (such as one or more of display 246, storage device 248 and communications interface 250).

The position of the bucket 227 may be displayed to an operator on display 246 (located inside the cab of the backhoe loader 200 next to the steering wheel). The position of the bucket 227 may also be stored on storage device 248 for later use or record keeping. The position of the bucket 227 may be transmitted across communications interface 250 to another device, such as an arm controller.

The position of the bucket 227 may indicate, for example, how far the bucket 227 is from the ground, which may be used to provide assistance to an operator to dig a trench of a particular depth, provide operation boundaries, or for fully automated control of the bucket 227. The position of the bucket 227 will usually be determined relative to the backhoe loader 200. However, the position of the bucket 227 in the real world may be determined when the position of the bucket 227 relative to the backhoe loader 200 is combined with data which indicates the position of the backhoe loader 200 in the real world (such as global positioning system data) and knowledge of the geometry of the backhoe loader 200.

In order for the neural network to be able to accurately determine the position of the bucket 227 using only images of the backhoe 220 taken with camera 242, and no sensors, it is necessary to find an efficient way to train the neural network with sufficient training data. The training data needs to include images of a backhoe 220 where the position of the bucket 227 is known. Such training data can then be used to perform supervised machine learning of the neural network. The applicant has found a particularly efficient way to collect a large amount of training data by using a training vehicle which has been adapted to collect training data as the training vehicle carries out normal, everyday, operations of a backhoe loader.

Figure 4:
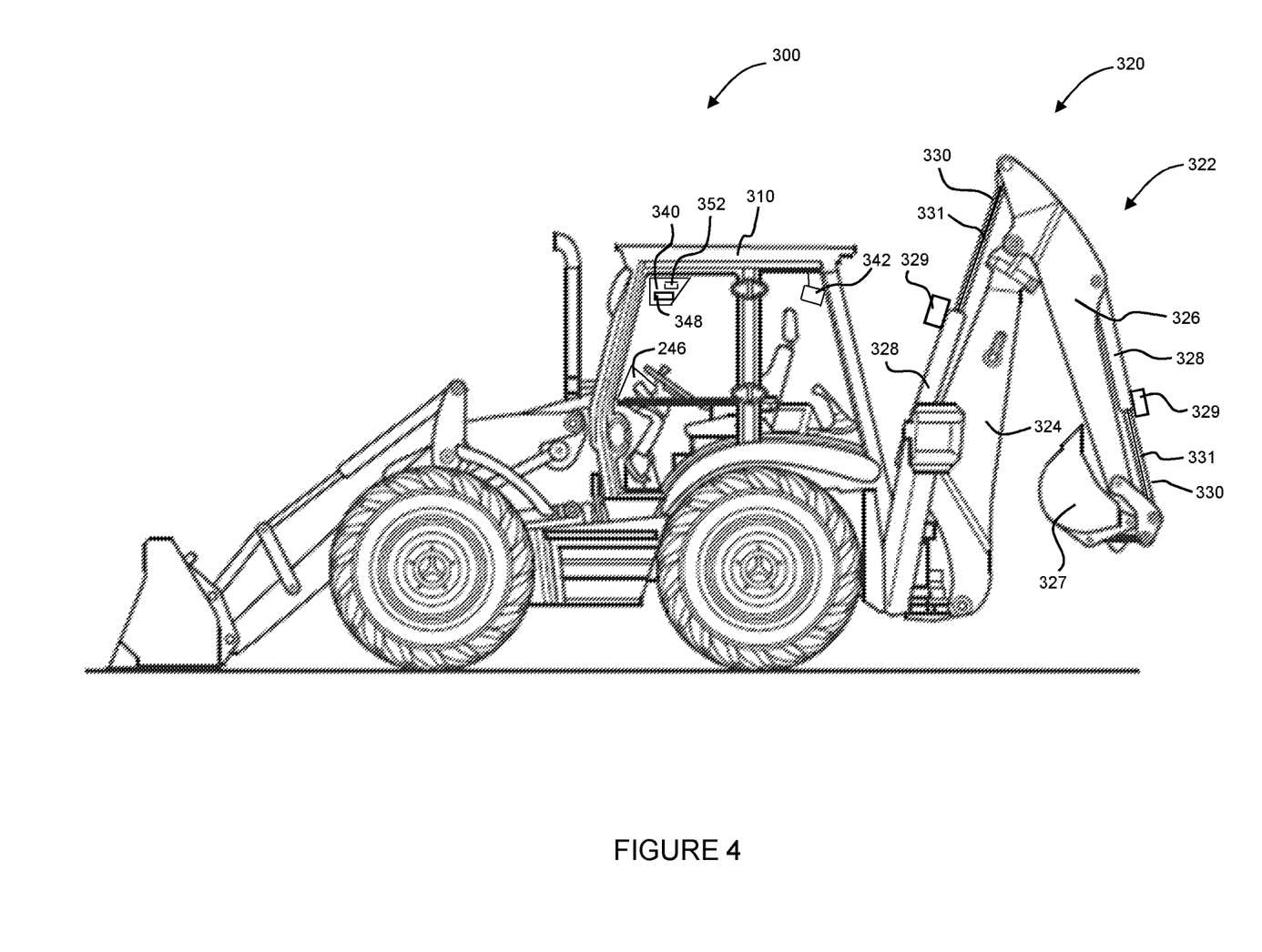
FIG. 4 illustrates a training machine which generates training data for training the neural network used by the backhoe loader of FIG. 2.

FIG. 4 illustrates an example of a training machine 300 which can be used to generate training data for supervising machine learning of the neural network, to allow the neural network to accurately determine the position of the bucket 227 just from images of the backhoe 220.

For the neural network to accurately recognise the position of the bucket 227 from images of the backhoe 220, it is important that the neural network has been trained using training data that was generated on the same type of working machine with the same type of attachment. So, the training machine 300 is the same type of backhoe loader as the backhoe loader 200, the boom 324 and dipper 326 that make up arm 322 have the same dimensions and range of movement as the boom 224 and dipper 226 that make up arm 222, and the bucket 327 has the same dimensions and range of movement as the bucket 227.

The training machine 300 has a rear-facing camera 342 mounted inside the cab with a view of the backhoe 320. To improve the chance that, once trained, the neural network will be able to accurately determine the position of the bucket 227 based solely on images of the backhoe 220, without the need for sensors, the camera 342 on the training machine 300 is located in the same position and orientation, and provides the same angle of view, as the camera 242 on backhoe loader 200.

The training machine 300 is operated as a regular backhoe loader, and is sent to carry out normal operations typical of a backhoe loader. For example, the training machine 300 may operate on a building site and take part in typical construction operations, such as digging a trench for a pipe. While the training machine 300 is carrying out normal operations, the training machine 300 is gathering training data for training the neural network.

The training machine 300 has a number of sensors 329 for determining the position of the bucket 327. In this example, each hydraulic actuator 328 on the training machine 300 has a sensor 329 incorporating a linear encoder for measuring the extension of an extendable portion 330 of the hydraulic actuator 328. Each sensor 329 is fixed adjacent to an extendable portion 330 of a hydraulic actuator (in this case, fixed to the housing of the hydraulic actuator 328). Each sensor 329 reads a scale 331 which is marked on the extendable portion 330 of the adjacent hydraulic actuator 328, in order to measure the extension of the extendable portion 330 of the hydraulic actuator 328. The measurements from sensors 329 can be used to derive the position of the bucket 327 relative to the training machine 300. Additionally, or alternatively, the training machine 300 may have one or more sensors incorporating a rotary encoder which can be used to derive the position of the bucket 327. Each rotary encoder determines the rotation angle between individual sections of the arm 320 (for example, between the body 310 and the boom 325, or between the boom 324 and the dipper 326) or between the arm 320 and the bucket 327.

Figure 5:
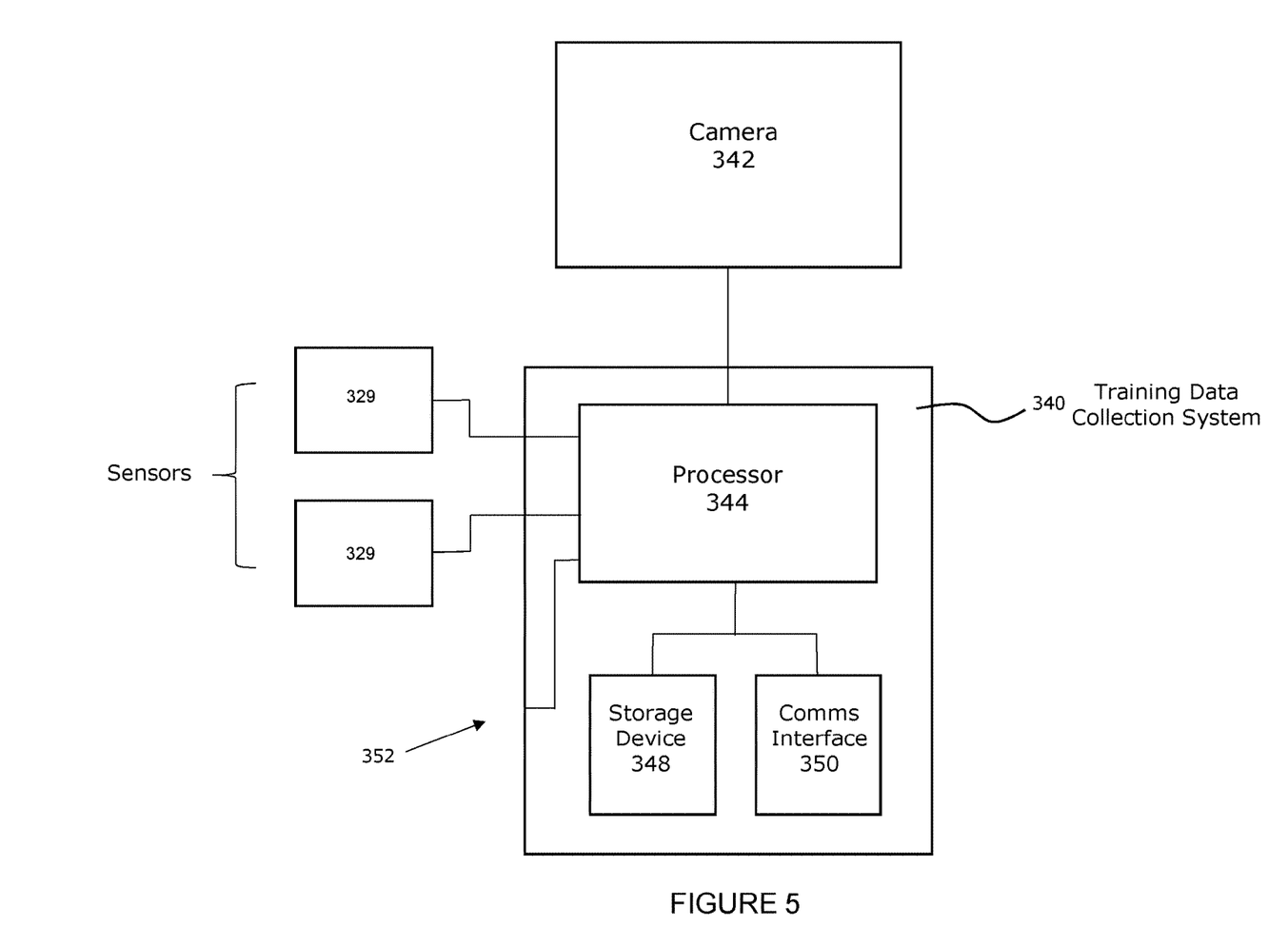
FIG. 5 illustrates a training data collection system.

FIG. 5 illustrates training data collection system 340. At regular intervals while the training machine 300 is carrying out tasks, the camera 342 captures an image of the backhoe 320, or at least part of the backhoe 320. Each image of the backhoe 320 is received by processor 344 in the training data collection system 340 located in the cab of the training machine 300. The processor 344 also receives sensor data from the sensors 329. The processor 344 synchronises each image with corresponding sensor data (for example, aligning a timestamp on each image with the sensor data having the closest timestamp). The processor 344 determines the position of the bucket 327 shown in each image from the corresponding sensor data. Each image of the backhoe 320 is stored together with the corresponding position of the bucket 327 on storage device 348, to build up a comprehensive set of training data.

The training data is stored on storage device 348 in the training data collection system 340 before the training data is transferred to a neural network training computer 640. Transfer of the training data to the neural network training computer 640 may either involve removing the storage device 348 from the training vehicle 300 (the storage device 348 may be mounted in a removable caddy in the cab of the training vehicle 300 to facilitate removal) or connecting a removable storage device to socket 352 (socket 352 may be located in the cab and may be, for example, a USB interface to which a portable hard disk or memory stick may be connected) and transferring the training data to a removable storage device. Alternatively the training data collection system 340 may have a communications interface 350, which transmits the training data over a wired or wireless communications network, whether directly to a neural network training computer or to a server.

It is desirable to operate the training machine 300 over a wide range of different tasks the backhoe loader 200 may be asked to perform, and to perform each of these different tasks under a wide range of different operating conditions the backhoe loader 200 might experience (such as different sites, varying lighting conditions, and a range of weather conditions). This is important in order to generate training data that provides adequate training for the neural network to be able to accurately determine the position of the bucket 227 from images taken during a wide range of combinations of tasks and operating conditions.

It is also advantageous to collect training data under a range of lighting conditions. For example, collecting training data with the training machine 300 at various times of day, such as, daytime, night time, twilight, dusk, and sunrise, and under artificial light (such as site lighting, or lights attached to the backhoe loader). When collecting training data using a light, or lights, attached to the training vehicle 300, it is advantageous for the light, or lights, on the training vehicle 300 to be positioned and angled the same as the light, or lights, on the backhoe loader 200, and for the lights on the training vehicle 300 to have the same intensity as the lights on the backhoe loader 200. Keeping the lighting consistent between the training vehicle 300 and the backhoe loader 200 helps to ensure that the shadows and lighting are similar between the training data and the images captured for the backhoe loader 200, increasing the accuracy with which the neural network can determine the position of the bucket 227.

Figure 6:
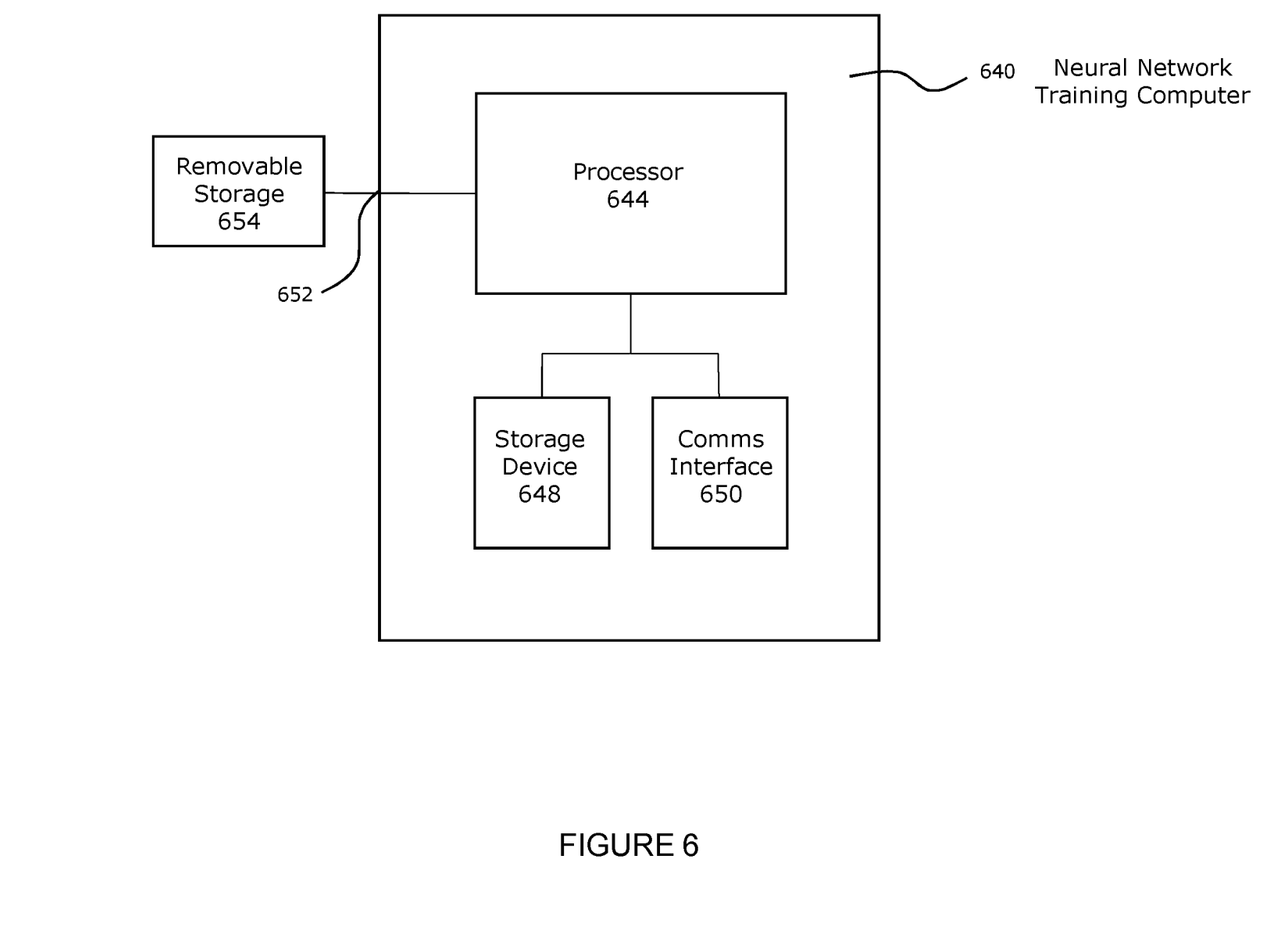
FIG. 6 illustrates a neural network training computer.

FIG. 6 illustrates the neural network training computer 640. The neural network training computer 640 receives training data from the training machine 300 either from a removable storage device attached to socket 652 (which may be a USB interface) or via communications interface 650 (which receives the training data from a wired or wireless communications network, either directly from the training vehicle 300 or from a server). The training data is stored on storage device 648 in the neural network training computer 640.

The training data provides a set of inputs (an image of the backhoe 322, or a portion of the backhoe 322) each paired with an expected output (the position of the bucket 327 derived from measurements with the sensors 329 at the time the image was taken) which makes the training data suitable for supervised machine learning of the neural network. The processor 644 runs a supervised machine learning algorithm to train the neural network so that the neural network can make accurate predictions of the position of the bucket 227 in new images for which the neural network has not previously been trained.

The trained neural network algorithm may be transferred to removable storage device 654 that is temporarily connected to socket 652. Once transferred, the removable storage device 654 may be disconnected and connected to socket 252 on the neural network system 240 in backhoe loader 200. Alternatively, the trained neural network may be transferred from the communications interface 650 over a wired or wireless network to the communications interface 250 of the neural network system 240 in backhoe loader 200.

The trained neural network algorithm may be transferred to the neural network system 240 to train the neural network for the first time, or to update the neural network (for example, to allow the neural network to recognise the position of a new attachment).

A working machine may have more than one attachment and the position of each attachment on the working machine may be determined using a neural network, based on images of each attachment.

Figure 7:
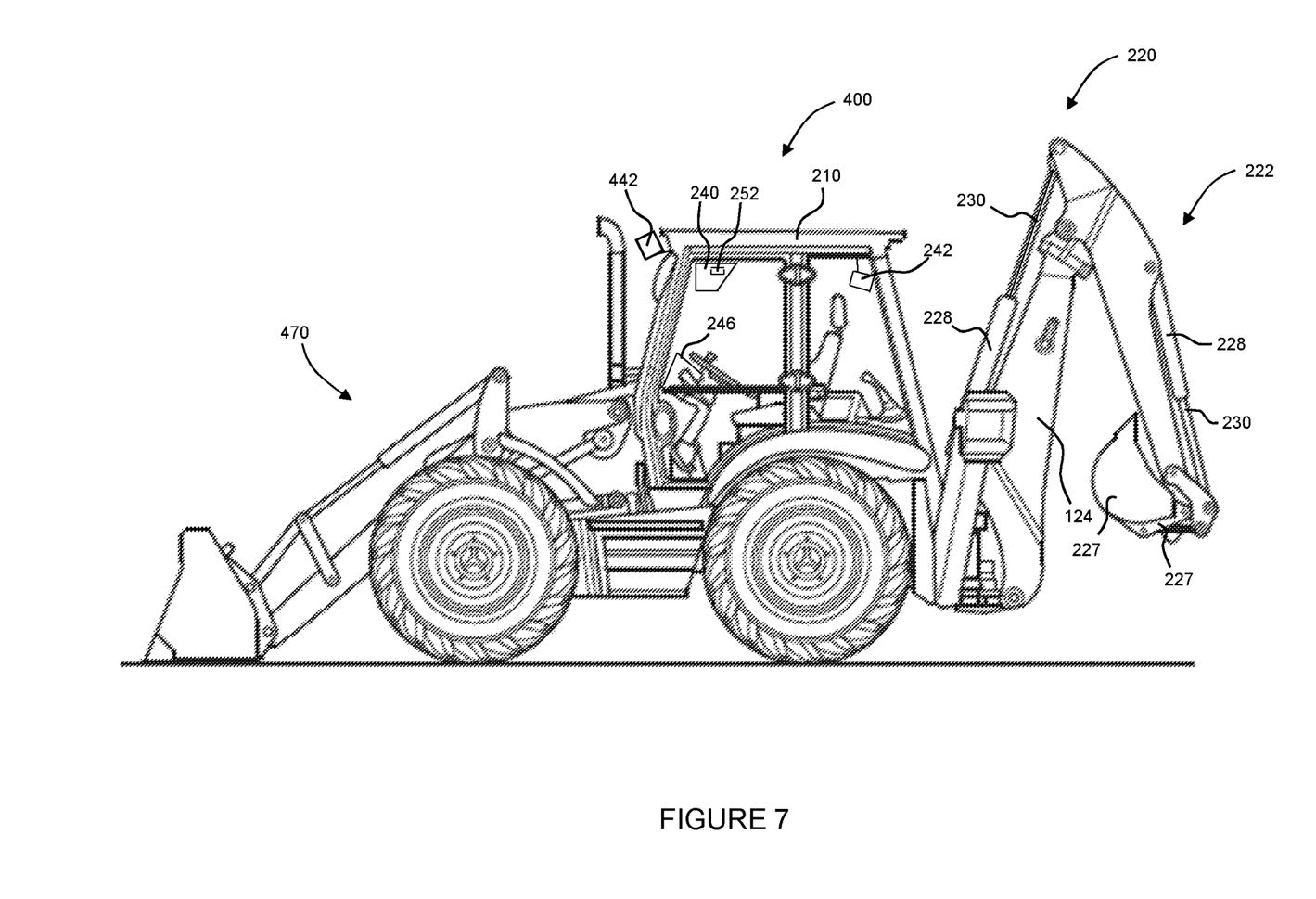
FIG. 7 illustrates a backhoe loader with two cameras.

FIG. 7 illustrates an example of a backhoe loader 400 with two attachments. In addition to the backhoe 220, the backhoe loader 400 has a shovel 470 attached to the front of the backhoe loader 400 by an arm. A second camera 442 is positioned with a field of view covering all or part of the arm and shovel 470. The neural network has been trained, using training data from a training vehicle having an identical shovel. The position and orientation of the arm and/or shovel (or any point on the arm and/or shovel) can be determined by processing images from the camera 442 through the neural network. The arm has a trapezoidal linkage which assists the neural network to identify the position of the shovel 470, even if the shovel 470 is out of view of the camera 442.

Although the invention has been described in terms of certain embodiments, the skilled person will appreciate that various modifications can be made without departing from the scope of the appended claims.

For example, although the working machine has been described as a backhoe loader and the moveable element as a backhoe and attachment, the use of a neural network to determine the position of a moveable element from images of the moveable element is equally applicable to other types of working machine with other types of moveable element, as long as the neural network has been trained for the particular combination of working machine and attachment. Further, although only one training machine has been described, it will be appreciated that to speed up the training process multiple training machines of the same type may be used simultaneously to capture training data under the various conditions described above in less overall time.

The camera may be mounted inside or outside the cab. Mounting the camera inside the cab may help to prevent theft, damage to the camera, or dirt from obscuring the camera.

The images may be colour or grayscale images. Colour images lead to more robust and reliable behaviour of the neural network, leading to more reliable position determination. Grayscale images may be preferable where faster training is desired and accuracy is of less concern. A further advantage of using a grayscale images is that the neural network will not be limited to recognising working machines having the same colour for which the neural network was trained, and the processing speed of the neural network may be increased.

The neural network may be a supervised deep learning neural network or a supervised convolution neural network. Although the invention has been described in terms of a neural network, the invention could be implemented with other kinds of machine learning algorithm that are suited to supervised machine learning.

The invention claimed is:

1. A method of generating training data for supervised machine learning, the method comprising:
   operating a training machine comprising a working machine having a camera, a sensor, a body, and a moveable element, wherein the moveable element is moveable relative to the body; and
   generating training data for training a machine learning algorithm to determine a position of the moveable element of the working machine based on an image of at least a portion of the moveable element, the generating training data step comprising:
   capturing, using the camera, an image of at least a portion of the moveable element; and
   determining, using the sensor, sensor data which corresponds to the image, wherein the sensor data indicates the position of the moveable element in the image.

2. The method of claim 1, wherein the position of the moveable element is the position of the moveable element relative to the working machine or the real world.

3. The method of claim 2, wherein generating training data comprises:
   operating the training machine during normal operations of the working machine; and
   capturing, using the camera, a plurality of images, wherein each image of the plurality of images is captured at a corresponding instance during the normal operations and each image comprises an image of at least a portion of the moveable element at the corresponding instance; and
   using the sensor, determining sensor data corresponding to each image, wherein the sensor data corresponding to each image indicates the position of the moveable element in the respective image.

4. The method of claim 1, wherein the training machine is one of: a backhoe loader; a tractor; a forklift; a skid steer loader; an excavator; and a telescopic handler.

5. The method of claim 1, wherein the moveable element comprises an arm and an attachment.

6. The method of claim 5, wherein the attachment is one of: a bucket; a blade; an agricultural tool; a hedge-cutter; or forks.

7. The method of claim 1, wherein the camera is arranged to provide an angle of view which covers a desired range of movement of the moveable element.

8. The method of claim 1, further comprising hydraulic equipment arranged to move the moveable element, wherein the camera is arranged to provide a view of at least a portion of the hydraulic equipment.

9. A training machine to generate training data for supervised machine learning, the training machine comprising:
   a working machine having a body, a moveable element, a camera and a sensor;
   wherein the moveable element is moveable relative to the body;
   the camera is arranged to capture an image of at least a portion of the moveable element; and
   the sensor is configured to determine sensor data that is indicative of a position of the moveable element;

the training machine further comprising:
a processor configured to generate training data for training a machine learning algorithm to determine a position of the moveable element of the working machine based on the image of at least a portion of the moveable element by receiving the image from the camera and corresponding sensor data from the sensor indicative of the position of the moveable element in the image.

10. The training machine of claim 9, wherein the position of the moveable element is the position of the moveable element relative to the working machine or the real world.

11. The training machine of claim 9, wherein the processor is configured to generate training data by:
receiving a plurality of images from the camera, wherein each image of the plurality of images is captured at a corresponding instance during normal operations and each image captures at least a portion of the moveable element at the corresponding instance; and
receiving sensor data corresponding to each image of the plurality of images, wherein the sensor data corresponding to each image indicates the position of the moveable element in the respective image.

12. The training machine of claim 9, wherein the training machine is one of: a backhoe loader; a tractor; a forklift; a skid steer loader; an excavator; or a telescopic handler.

13. The training machine of claim 9, wherein the moveable element comprises an arm and an attachment.

14. The training machine of claim 9, wherein the sensor is configured to determine the position of the arm or attachment.

15. The training machine of claim 14, wherein the sensor is configured to determine at least of one: an extension of a hydraulic actuator driving the arm; and an angle of rotation between sections of the arm.

16. The training machine of claim 13, wherein the attachment is one of: a bucket; a blade; an agricultural tool; a hedge-cutter; or forks.

17. The training machine of claim 9, wherein the camera is arranged to provide an angle of view which covers a desired range of movement of the moveable element.

18. The training machine of claim 9, wherein the camera is arranged in the same position and orientation as a camera on a production working machine, and the camera is arranged to provide the same angle of view as the camera on the production working machine.

19. The training machine of claim 9, further comprising hydraulic equipment arranged to move the moveable element, wherein the camera is arranged to provide a view of at least a portion of the hydraulic equipment.

20. A computer-implemented method of training a machine learning algorithm to determine a position of a moveable element of a working machine based on an image of at least a portion of the moveable element, the method comprising:
providing training data comprising:
a plurality of images of the moveable element, each image of the plurality of images having corresponding sensor data indicative of a position of the moveable element in the respective image; and
using the training data, in order to train the machine learning algorithm to recognise a position of a moveable element in an image without corresponding sensor data.

21. The computer-implemented method of claim 20, wherein the position of the moveable element is the position of the moveable element relative to the working machine or the real world.

22. The computer-implemented method of claim 20, wherein the training data has been generated by a training machine.

23. The computer-implemented method of claim 20, wherein the machine learning algorithm comprises a neural network.

* * * * *